(12) United States Patent
Gubbe et al.

(10) Patent No.: US 8,665,115 B2
(45) Date of Patent: Mar. 4, 2014

(54) ACCESSIBLE PEDESTRIAN SIGNAL SYSTEM

(75) Inventors: Douglas Gubbe, Surrey (CA); David Philip Atnikov, Port Moody (CA)

(73) Assignee: Novax Industries Corporation, Delta (CA)

(*) Notice: Subject to any disclaimer, the term of this patent is extended or adjusted under 35 U.S.C. 154(b) by 249 days.

(21) Appl. No.: 13/163,311

(22) Filed: Jun. 17, 2011

(65) Prior Publication Data

US 2011/0309952 A1 Dec. 22, 2011

Related U.S. Application Data

(60) Provisional application No. 61/357,198, filed on Jun. 22, 2010.

(51) Int. Cl.
G08G 1/00 (2006.01)

(52) U.S. Cl.
USPC .......................................... 340/925; 340/906

(58) Field of Classification Search
USPC ...................... 340/925, 906, 944, 907, 931
See application file for complete search history.

(56) References Cited

U.S. PATENT DOCUMENTS

| | | | |
|---|---|---|---|
| 3,596,238 A | 7/1971 | Siklos | |
| 4,253,083 A | 2/1981 | Imamura | |
| 4,851,836 A | 7/1989 | Wilkinson et al. | |
| 5,172,092 A | 12/1992 | Nguyen et al. | |
| 5,241,307 A | 8/1993 | Bidault et al. | |
| 6,127,943 A | 10/2000 | Tauchi et al. | |
| 6,340,936 B1 | 1/2002 | McGaffey et al. | |
| 6,466,140 B1 | 10/2002 | McGaffey et al. | |
| 6,982,630 B2 | 1/2006 | Beckwith et al. | |
| 7,145,476 B2 | 12/2006 | Beckwith et al. | |
| 7,253,720 B2 | 8/2007 | Beckwith et al. | |
| 2003/0016143 A1* | 1/2003 | Ghazarian | 340/901 |
| 2005/0110660 A1* | 5/2005 | Jacobs | 340/944 |
| 2011/0148660 A1* | 6/2011 | Tate et al. | 340/906 |

FOREIGN PATENT DOCUMENTS

| WO | 8706751 | 11/1987 |
|---|---|---|
| WO | 2010022179 | 2/2010 |

OTHER PUBLICATIONS

Noyce et al., "Interfacing Accessible Pedestiran Signals (APS) with Traffic Signal Control Equipment", Apr. 2003, http://www.access-board.gov/research/APS/report.htm.
Gubbe, Douglas; SoundSafe(TM), An Evolution in Sound Safety, 2008, 24 pages.
Gubbe, Douglas; The Future of APS NOW!, IMSA 113th Annual Conference, Jul. 20, 2008, 34 pages.
Novax Industries Corporation, SoundSafe(TM) brochure, Jul. 2008, 2 pages.

* cited by examiner

*Primary Examiner* — Hoi Lau
(74) *Attorney, Agent, or Firm* — Oyen Wiggs Green & Mutala LLP

(57) ABSTRACT

Methods and systems are provided for conflict monitoring and error detection in accessible pedestrian signal systems. A primary conflict monitor and error detector is configured to control output of audible and vibrotactile pedestrian signal indications. The primary conflict monitor and error detector monitors the current traffic state, and verifies audio and vibrotactile control signals against the current traffic state and user settings to determine whether to enable output of audible and vibrotactile pedestrian signal indications. The primary conflict monitor and error detector may transmit information about the audio and vibrotactile control signals to a secondary conflict monitor and error detector, which verifies the information received against the current traffic state and user settings, and inhibits output of audible and vibrotactile pedestrian signal indications in the event of a detected conflict or error.

20 Claims, 6 Drawing Sheets

ACCESSIBLE PEDESTRIAN SIGNAL SYSTEM

REFERENCE TO RELATED APPLICATION

This application claims priority from, and claims the benefit under 35 USC 119(e) of, U.S. provisional application No. 61/357,198 filed 22 Jun. 2010, which is hereby incorporated herein by reference.

TECHNICAL FIELD

This invention relates to systems and methods for accessible pedestrian signal (APS) systems which provide non-visual pedestrian signal indications.

BACKGROUND

APS systems provide pedestrian signal indications in a non-visual format such as: audible (e.g. sounds, tones, verbal messages, etc.) or vibrotactile (e.g. vibrating raised pushbutton surface) formats. APS systems may generate different types of signal indications for different applications. For example, APS systems typically have different audible "walk" indications for east-west and north-south crossings, in addition to pole locator tones, wait tones, and the like. It is important that APS systems provide correct pedestrian signal indications to protect the safety of visually impaired or visually and hearing impaired pedestrians.

A traffic light control system typically incorporates a malfunction management unit (MMU) which monitors traffic signal channels for conflicting inputs and invalid signal voltage levels and the like, and responds to a detected failure or abnormal condition. As conventional MMUs are designed for traffic control systems which provide basic visual traffic signal information, such MMUs may generally lack the control to reliably recognize and respond to conflict or error in non-visual pedestrian signal indications as generated by APS systems, and particularly, with respect to multiple types of audible indications for different applications.

There is a general desire to provide conflict monitoring and error detection for APS systems. There is a general desire to provide APS systems incorporating conflict monitoring and error detection which may be retrofit into existing traffic control systems.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
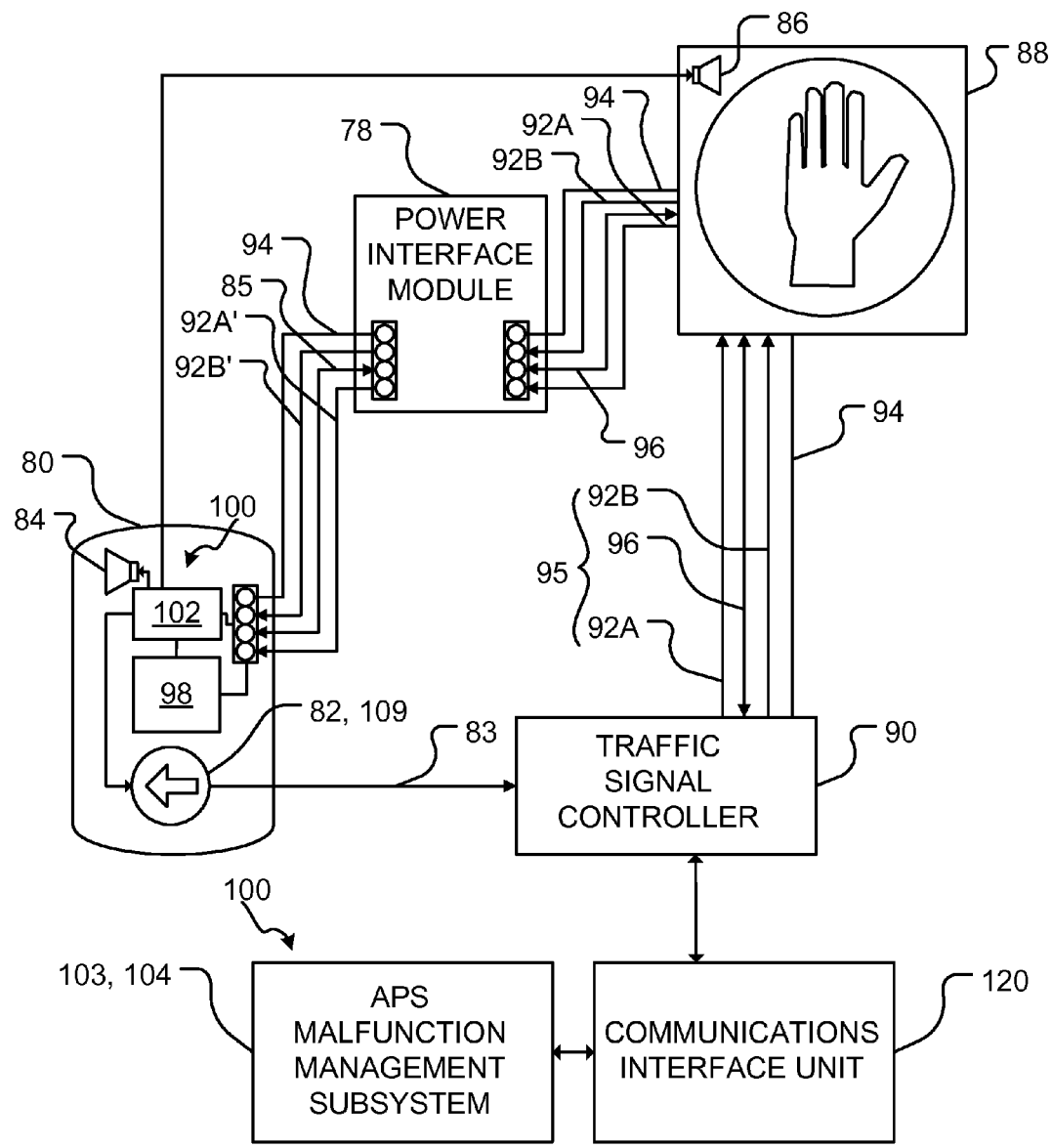
FIG. 1 schematically depicts a conflict monitoring and error detection system according to a particular embodiment which may be implemented for an APS button station.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. As used herein, "actual" signals, indications, parameters, modes and the like refer to signals, indications, parameters, modes and the like actually generated, provided and/or output by an APS system, regardless of whether the APS system is functioning correctly. "Expected" signals, indications, parameters, modes and the like refer to signals, indications, parameters, modes and the like which are expected to be, or ought to be, generated, provided and/or output by an APS system which is functioning correctly.

According to particular embodiments, an APS system is integrated into a pedestrian button station provided at a pedestrian crosswalk. Each button station has a pushbutton which may be pushed by the pedestrian to request service from a traffic signal controller at the crosswalk (i.e. to request the go-ahead signal to cross the street). The pushbutton may be a vibrotactile raised pushbutton capable of providing vibrotactile pedestrian signal indications. The button station may include a "button" speaker (so-named as it is located at the button station). The APS system may optionally include an overhead speaker, typically mounted in or to a pedestrian signal head which provides visual pedestrian signal indications. The button and overhead speakers may play audible pedestrian signal indications such as sounds, tones, verbal messages and the like.

The button station incorporates a primary conflict monitor and error detector which controls the outputs to the button speaker (and the overhead speaker, if provided) and the vibration actuator for the pushbutton. In particular embodiments, the speakers and vibration actuator may be in a disabled state by default, and may be enabled only when the primary conflict monitor and error detector has verified that conditions are such that the speakers and vibration actuator may be enabled. For example, one condition that may be verified is whether the actual signals sent to the speakers or vibration actuator match the expected signals for the speakers or vibration actuator based on the current traffic state as determined from pedestrian signals (e.g. WALK, FLASHING DON'T WALK, or SOLID DON'T WALK) and user settings (which for an audio signal may define parameters such as the sound type for a particular traffic state, frequency of sound output, etc., and for a vibrotactile signal may define parameters such as the mode of vibratory feedback for a particular traffic state).

According to particular embodiments, sound files representing audible pedestrian signal indications are encoded with a digital code representing information about (i.e. meta data) or identifying parameters of the signal indication such as: pedestrian signal type, sound type, message, and length of the message. The primary conflict monitor and error detector detects and receives signals to be sent to the speakers, decodes the portions of the signals containing the digital code of a sound file, and based on such decoded information, verifies that the sounds to be played by the speakers conform with the current traffic state and user settings. In certain embodiments, the primary conflict monitor and error detector also detects and receives signals to be sent to the vibration actuator, and verifies that the signals conform with the current traffic state and user settings.

In some embodiments, secondary conflict monitoring and error detection may be implemented by an APS malfunction management subsystem. The button station may transmit information about its actual non-visual pedestrian signal indications to the APS malfunction management subsystem, which verifies such information against the current traffic state and user settings (to determine whether the actual signals match the expected signals), detects conflict or error, and responds to any detected conflict or error. Such response may include inhibiting audible and/or vibrotactile output at the button station where the conflict or error is detected. In particular embodiments, information about a button station's actual non-visual pedestrian signal indications is sent to the APS malfunction management subsystem over a powerline communications network.

FIG. 1 illustrates a conflict monitoring and error detection system 100 according to a particular embodiment for an APS button station 80 which includes a pushbutton 82 and a button speaker 84. An optional overhead speaker 86 is mounted in a pedestrian signal head 88. Speakers 84, 86 are operable to play audible pedestrian signal indications (e.g. sounds, tones, verbal messages and the like). Pushbutton 82 may comprise a vibrotactile raised pushbutton which may be driven by an actuator 109 to provide vibrotactile pedestrian signal indications (e.g. vibrations which may be detected by a pedestrian touching pushbutton 82).

Pedestrians wishing to cross the street may request service from traffic signal controller 90 by pushing pushbutton 82. Pedestrian input to pushbutton 82 is provided by wire 83 to traffic signal controller 90. Traffic signal controller 90 generates traffic control signals including pedestrian signals, and communicates the pedestrian signals to pedestrian signal head 88. The pedestrian signals are carried over two wires or lines: line 92A which may assert the WALK signals and line 92B which may assert the DON'T WALK (and flashing DON'T WALK) signals. Signals asserted on lines 92A, 92B determine the current traffic state for pedestrians at button station 80 (i.e. WALK, FLASHING DON'T WALK, or SOLID DON'T WALK).

Button station 80 receives pedestrian signals through a power interface module 78 connected between pedestrian signal head 88 and button station 80 (see FIG. 1). Power interface module 78 may incorporate a rectifier circuit (not shown) to convert the AC voltage of lines 92A, 92B to a DC voltage at a voltage level suitable for use in button station 80 (for example, from 120V AC at lines 92A, 92B to 12V DC at lines 92A', 92B'). In the illustrated embodiment, pedestrian signals provided to button station 80 are carried over a 12V DC line 92A' providing the WALK signals and a 12V DC line 92B' providing the DON'T WALK (and flashing DON'T WALK) signals.

As shown in FIG. 1, an earth ground line 94 and an AC neutral line 96 are connected to traffic signal controller 90 and to pedestrian signal head 88. Earth ground line 94 may be connected to DC common lines, in some embodiments. Information from button station 80 may be transmitted via a combination of lines 85 and 94 at the DC side of the power interface module 78 and lines 92A, 92B and/or 96 (collectively, a "powerline communications line 95") at the AC side of the power interface module 78. Line 85 may be a communications wire between button station 80 and power interface module 78. Information from button station 80 may be communicated over the powerline communications line 95 to other button stations connected to traffic signal controller 90. Information from button station 80 may be transmitted over powerline communications line 95 to a secondary conflict monitor and error detector 103 through communications interface unit 120.

An APS generator 98 in button station 80 generates control signals for providing non-visual (e.g. audible and vibrotactile) pedestrian signal indications, based on the pedestrian signals carried over lines 92A', 92B' to button station 80. APS generator 98 transmits the control signals to the appropriate outputs (e.g. speakers 84, 86 and vibration actuator 109). Before such control signals reach their intended outputs, they are processed and verified by a primary conflict monitor and error detector 102 of system 100. Primary conflict monitor and error detector 102 may be contained within button station 80's housing.

Figure 2:
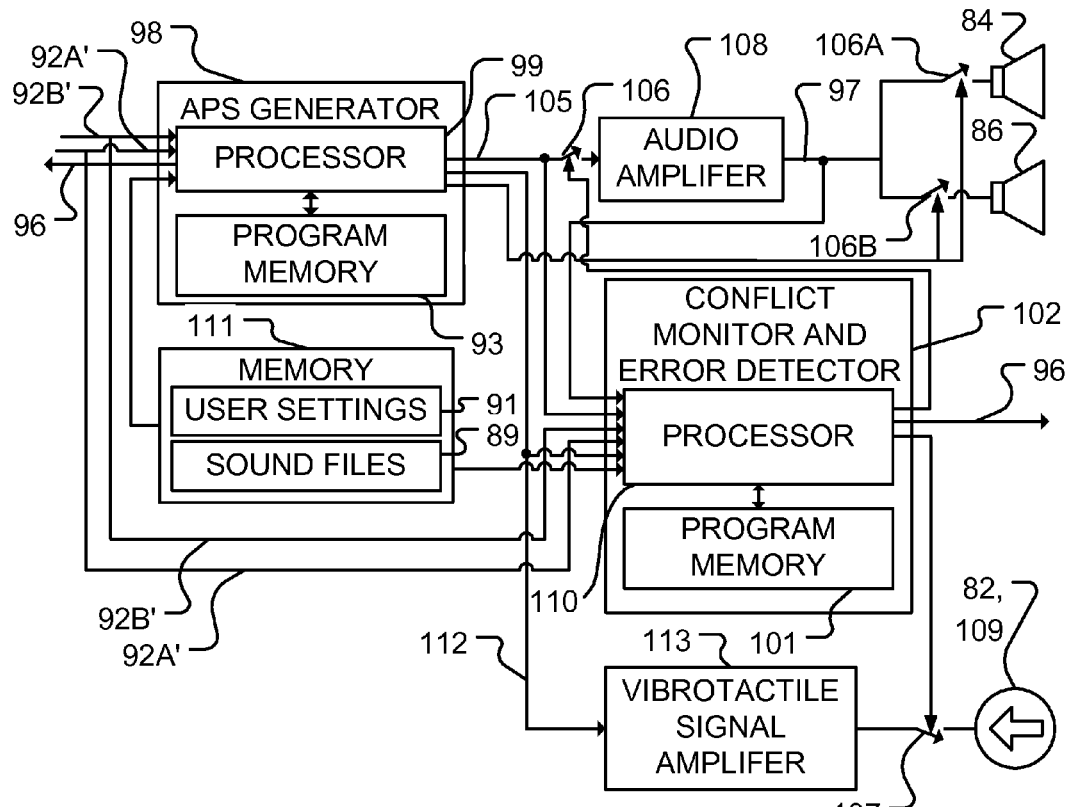
FIG. 2 schematically depicts a primary conflict monitor and error detector according to one embodiment that may be used in the conflict monitoring and error detection system of FIG. 1.

As shown in FIG. 2, primary conflict monitor and error detector 102 controls the state of a relay or switch 106 connected between APS generator 98 and speakers 84, 86. Relay 106 may be positioned prior to audio amplifier 108 in the path between APS generator 98 and speakers 84, 86. Primary conflict monitor and error detector 102 controls the state of a relay or switch 107 connected to vibration actuator 109. In particular embodiments, relays 106 and 107 are by default in their open (disabled) state. It is only after primary conflict monitor and error detector 102 determines that certain conditions are satisfied (or that no conflicts or errors are detected) that relays 106 and 107 are switched temporarily to their closed (enabled) states thereby enabling audible output from speakers 84, 86 and vibrotactile output from pushbutton 82.

In the illustrated embodiment, APS generator 98 controls the state of a relay or switch 106A connected to speaker 84 and a relay or switch 106B connected to speaker 86. APS generator 98 may control the state of relays 106A, 106B based at least in part on configurable user settings 91 for button station 80 stored in a memory 111 at button station 80. User settings 91 are explained in further detail below.

According to certain embodiments, audio control signals sent to speakers 84, 86 are encoded with digital codes or signatures which, when decoded by primary conflict monitor and error detector 102, identify parameters of the audible pedestrian signal indications that are to be played by speakers 84, 86. Each sound available for output by speakers 84, 86 may be stored in audio format as a sound file 89 including a header 87 containing a digital code (see FIG. 3). The audio control signals that are generated by APS generator 98 include the digital code for each sound file 89. The digital code provides information about the sound in each sound file 89, such as:

Signal type (e.g. WALK, FLASHING DON'T WALK, SOLID DON'T WALK and/or other signal types).

Sound code or number identifying the type of sound (e.g. chirp; cuckoo; click; beep; a particular tune; a verbal message such as "walk sign is on", "wait", "emergency vehicle approaching," or "train approaching"; etc.).

Sound description (text field identifying the sound type in a written description—e.g. "chirp", "cuckoo").

Length of the message (e.g. this may typically range from approximately 0.1 second to approximately 3 seconds).

Message (e.g. walk—east-west crossing; walk—north-south crossing; wait or clear the crosswalk; don't walk; pole locator; button press acknowledged; pedestrian call acknowledged; train crossing; error alert, etc.).

Figure 3:
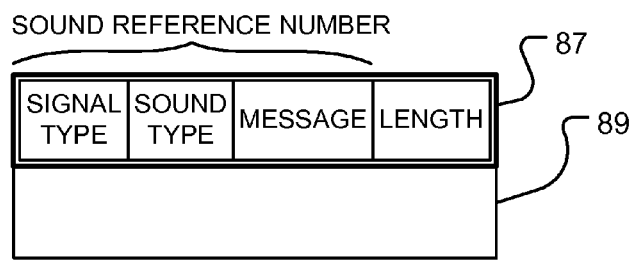
FIG. 3 depicts the contents of a sound file that may be used in the conflict monitoring and error detection system of FIG. 1.

In certain embodiments, a portion of each header 87 may be represented as a sound reference number (see FIG. 3). The sound reference number may identify information for certain fields such as signal type, sound type and/or message. The sound reference number may be used as an index to a look-up table that identifies signal type, sound type, and/or message.

A plurality of sound files 89, each sound file 89 representing a sound available for output to speakers 84, 86, may be stored in memory 111 at button station 80 (FIG. 2). In the FIG. 2 embodiment, memory 111 also stores configurable user settings 91 for button station 80. User settings 91 may define settings for button station 80 such as the sound type for a message and signal type; the order in which messages are to be played; the frequency at which a message is to be repeated; the maximum duration over which a particular message is to be repeated; the speakers from which the sounds are to be played (e.g. button speaker, overhead speaker, or both); the volume of sounds, including maximum and minimum volume levels, gain above ambient volume levels, time-specific maximum volume levels (e.g. maximum volume levels applied during evenings or at night); order in which messages are to be played; and the like. Different user settings 91 may apply depending on the operating conditions, such as whether the pedestrian's button push is long or short in duration.

Memory 111 may be accessible to processor 99 of APS generator 98 and processor 110 of primary conflict monitor and error detector 102. Processor 99 receives pedestrian signals asserted on lines 92A', 92B', and executes instructions provided by software stored in program memory 93 to retrieve user settings 91 from memory 111, select one or more sound files 89 from memory 111 (based on the input pedestrian signals and user settings 91), and generate audio signals 105 (control signals which are sent to audio amplifier 108). Audio signals 105 may be pulse-width modulated signals, in particular embodiments. In other embodiments, processor 99 generates digital audio signals. Digital audio signals may be converted to analog pulse-width modulated signals by a signal converter for playback by speakers 84, 86. In some embodiments, processor 99 may synthesize digital audio signals based on data (e.g. textual data) stored in memory 111.

In certain embodiments, processor 99 sends signals to selectively open or close relays 106A, 106B based on relevant user settings 91. Relevant user settings 91 may identify, for example, one or more of: the speaker(s) from which each message is to be played (e.g. button speaker, overhead speaker, or both), the frequency at which an audible message is to be repeated; the duration of the audible message, and/or the like.

Audio amplifier 108 amplifies audio signals 105 to provide suitable audio signals 97 to drive speakers 84, 86 to play audible pedestrian signal indications. Primary conflict monitor and error detector 102 detects and receives the audio signals prior to their output to speakers 84, 86. In particular embodiments, conflict monitor and error detector 102 detects and receives audio signals 97 prior to their amplification by audio amplifier 108 and before their output to speakers 84, 86.

Primary conflict monitor and error detector 102 decodes each detected signal 97. In particular embodiments (such as those described with reference to FIG. 3), each sound file 89 may contain a digital code in a header 87, represented by the first n bits of each sound file 89. Primary conflict monitor and error detector 102 may decode the beginning portion of each detected signal 97 corresponding to header 87 of a sound file 89. Primary conflict monitor and error detector 102 compares the decoded information with the current traffic state and user settings 91 (as accessed from memory 111). Primary conflict monitor and error detector 102 may determine the current traffic state (e.g. WALK, FLASHING DON'T WALK, or SOLID DON'T WALK) by monitoring pedestrian signals carried over lines 92A', 92B'.

If certain conditions are satisfied (as described in further detail below), primary conflict monitor and error detector 102 moves relay 106 to a closed position, enabling signal 97 to be played by one or both of speakers 84, 86 (depending on the state of relays 106A, 106B which are controlled by APS generator 98). According to particular embodiments described herein, the portion of signal 97 that is output to and played by speakers 84, 86 includes the audible pedestrian signal indication, but excludes sound header information. Header 87 of sound file 89 is not output to speakers 84, 86 because relay 106 is maintained in its default open position while primary conflict monitor and error detector 102 is processing and decoding header 87. Therefore, the portion of signal 97 that represents header 87 of sound file 89 is prevented from reaching speakers 84, 86.

In particular embodiments, for each signal 97 detected by primary conflict monitor and error detector 102, primary conflict monitor and error detector 102 may evaluate whether the following conditions are satisfied:

- A valid header 87 is decoded from signal 97. A missing, invalid or unrecognizable header is indicative of a conflict or error.
- A valid traffic state (i.e. WALK, FLASHING DON'T WALK, or SOLID DON'T WALK) is determinable from signals on lines 92A', 92B'. Signals should be asserted on only one of lines 92A', 92B' at any one time. A simultaneous assertion of signals (or no assertion of signals) on lines 92A', 92B' is indicative of a conflict or error. For example, a short circuit (such as may be caused by water leaking into button station 80's housing) may result in simultaneous assertion of signals on lines 92A', 92B'.
- The signal type of signal 97 (as determined by the signal type decoded from header 87) matches the current traffic state (e.g. as determined by the signals on lines 92A', 92B'). A mismatch in the signal type is indicative of a conflict or error.
- The sound type of signal 97 (as determined by the sound type decoded from header 87) matches the sound type set in user settings 91 for the current traffic state. For example, for a current traffic state of WALK, user settings 91 may specify that the sound type is a cuckoo sound. A mismatch in the sound type is indicative of a conflict or error.

In other embodiments, other conditions may be evaluated by primary conflict monitor and error detector 102 to determine whether the actual signals match the expected signals for speakers 84, 86 and vibration actuator 109. For example, audio signals 97 may be evaluated to determine if the sounds to be played conform with other parameters defined in user settings 91 (e.g. the order in which messages are to be played, the frequency at which a message is to be repeated, the maximum duration over which a particular message is to be repeated, etc.).

If the foregoing conditions are satisfied (i.e. no conflict or error is detected), primary conflict monitor and error detector 102 closes relay 106 for a duration based on the message length, as specified in header 87. Once relay 106 has closed for the determined duration, it returns to its default open position.

If one of the foregoing conditions is not satisfied (i.e. a conflict or error is detected), relay 106 is maintained in its default open position. Primary conflict monitor and error detector 102 may transmit an error message, providing information about the detected conflict or error, via powerline communications line 95 to an APS malfunction management subsystem 104 (described in further detail below). Audible output may remain disabled until button station 80's operation is reset by service personnel.

In addition to verifying audio signals to speakers 84, 86, vibrotactile control signals generated by APS generator 98 may be verified by primary conflict monitor and error detector 102 prior to being received at vibration actuator 109. In the illustrated embodiment of FIG. 2, primary conflict monitor and error detector 102 detects and receives control signals 112 for driving vibration actuator 109. Control signals 112 are generated by APS generator 98 based on user settings 91 and the pedestrian signals carried over lines 92A', 92B' and received at button station 80. In certain embodiments, user settings 91 define characteristics for different modes of vibratory feedback. Traffic states such as WALK or FLASHING/SOLID DON'T WALK may be associated with a particular mode of vibratory feedback. Control signals 112 drive vibration actuator 109 to provide one mode of vibratory feedback (e.g. constant vibration) during a WALK interval (i.e. while a signal on line 92A' is being asserted), and another mode of vibratory feedback (e.g. 0.15 second of vibration every 1 second, or some other periodic vibration) during a FLASHING DON'T WALK or SOLID DON'T WALK interval (i.e. while a signal on line 92B' is being asserted).

To determine whether to enable output of control signal 112 to vibration actuator 109, primary conflict monitor and error detector 102 may compare the actual and expected modes of vibratory feedback. This comparison may be performed each time the current traffic state changes. The actual mode of vibratory feedback may be determined from control signal 112. The expected mode of vibratory feedback may be determined from user settings 91 and the current traffic state (as ascertained from pedestrian signals on lines 92A', 92B'). If the actual and expected modes of vibratory feedback match, primary conflict monitor and error detector 102 causes relay 107 to be closed in accordance with control signal 112, enabling vibrotactile pedestrian signal output according to the actual and expected mode of vibratory feedback. In some embodiments primary conflict and error detector 102 causes relay 107 to be closed after a predetermined delay time and may maintain relay 107 in its closed position for a defined period. For example, for the FLASHING DON'T WALK or SOLID DON'T WALK mode, relay 107 may be closed for a period equal to the DON'T WALK message duration plus a relay advance time, and is thereafter opened; this is repeated so long as the WALK traffic state is not active and a walk_play_order state (a state set based on the order in which messages are to be played, as determined by user settings 91) is not active. For the WALK mode, relay 107 is closed as long as certain conditions are true—e.g. the WALK traffic state is asserted and walk_play_order state is active. In particular embodiments, such as the one illustrated in FIG. 2, signals 112 are amplified by an amplifier 113 to provide suitable signals to drive vibration actuator 109.

A mismatch or difference between the actual and expected modes of vibratory feedback is indicative of a conflict or error. If there is a mismatch, relay 107 is maintained in its default open position. Primary conflict monitor and error detector 102 may transmit an error message, providing information about the detected conflict or error, via powerline communications line 95 to an APS malfunction management subsystem 104 (described in further detail below). Vibrotactile output may remain disabled until button station 80's operation is reset by service personnel.

Figure 4:
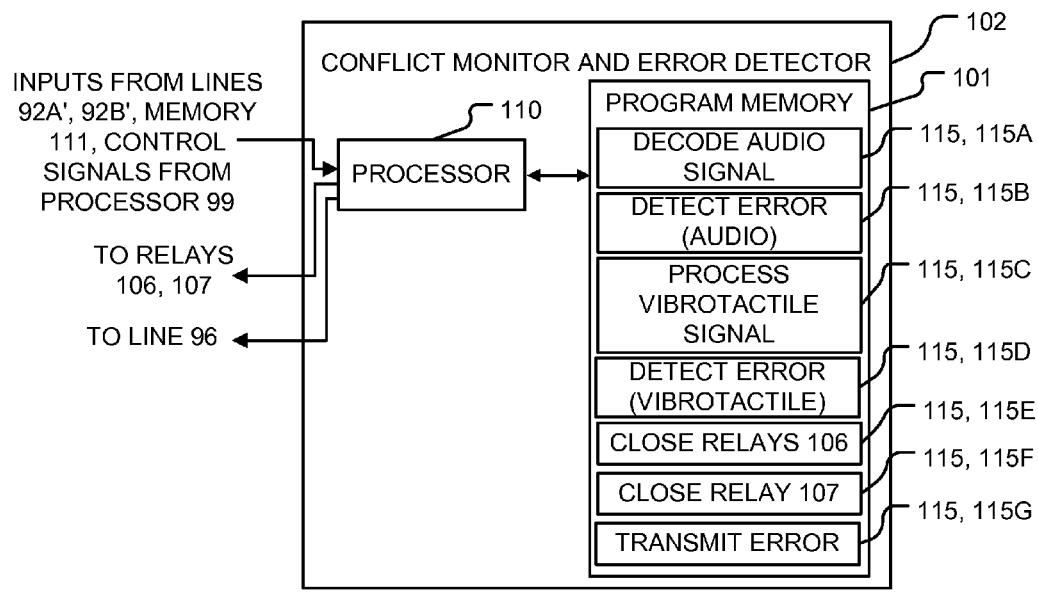
FIG. 4 schematically depicts a specific implementation of the FIG. 2 primary conflict monitor and error detector according to one embodiment.

APS generator 98 and primary conflict monitor and error detector 102 may be implemented as software, hardware and/or a combination thereof. As illustrated in FIG. 2, APS generator 98 may comprise a processor 99 which executes instructions provided by software stored in a program memory 93 accessible by processor 99. As illustrated in FIGS. 2 and 4, primary conflict monitor and error detector 102 may comprise a processor 110 which executes instructions provided by software stored in a program memory 101 accessible by processor 110. Processors 99, 110 may comprise central processing units (CPUs), microprocessors, field programmable gate arrays (FPGAs), or any combination thereof, or any other suitable processing unit(s) comprising hardware and/or software capable of functioning as described herein.

As seen in FIG. 4, software stored in program memory 101 may include functions 115 to perform the conflict monitoring and error detection steps described above, such as:

Function 115A for decoding an audio signal generated by APS generator 98 (e.g. to extract sound header information).

Function 115B for detecting a conflict or error with respect to an audio signal (e.g. by verifying the decoded sound header information for a sound file against the current traffic state and user settings, and identifying any mismatch in signal type or sound type).

Function 115C for processing a vibrotactile control signal generated by APS generator 98 (e.g. to determine the actual mode of vibratory feedback).

Function 115D for detecting a conflict or error with respect to a vibrotactile control signal (e.g. by verifying the actual mode of vibratory feedback against the expected mode of vibratory feedback based on the current traffic state and user settings, and identifying any mismatch between the actual and expected modes of vibratory feedback).

Function 115E for closing one or both of relays 106A, 106B if no conflict or error is detected by function 115B. Function 115E may determine which relays to close and the duration that the relays are to remain closed, based on decoded header information for a sound file 89.

Function 115F for closing relay 107 if no conflict or error is detected by function 115D.

Function 115G for generating and transmitting an error message for each conflict or error detected by functions 115B or 115D.

Figure 6:
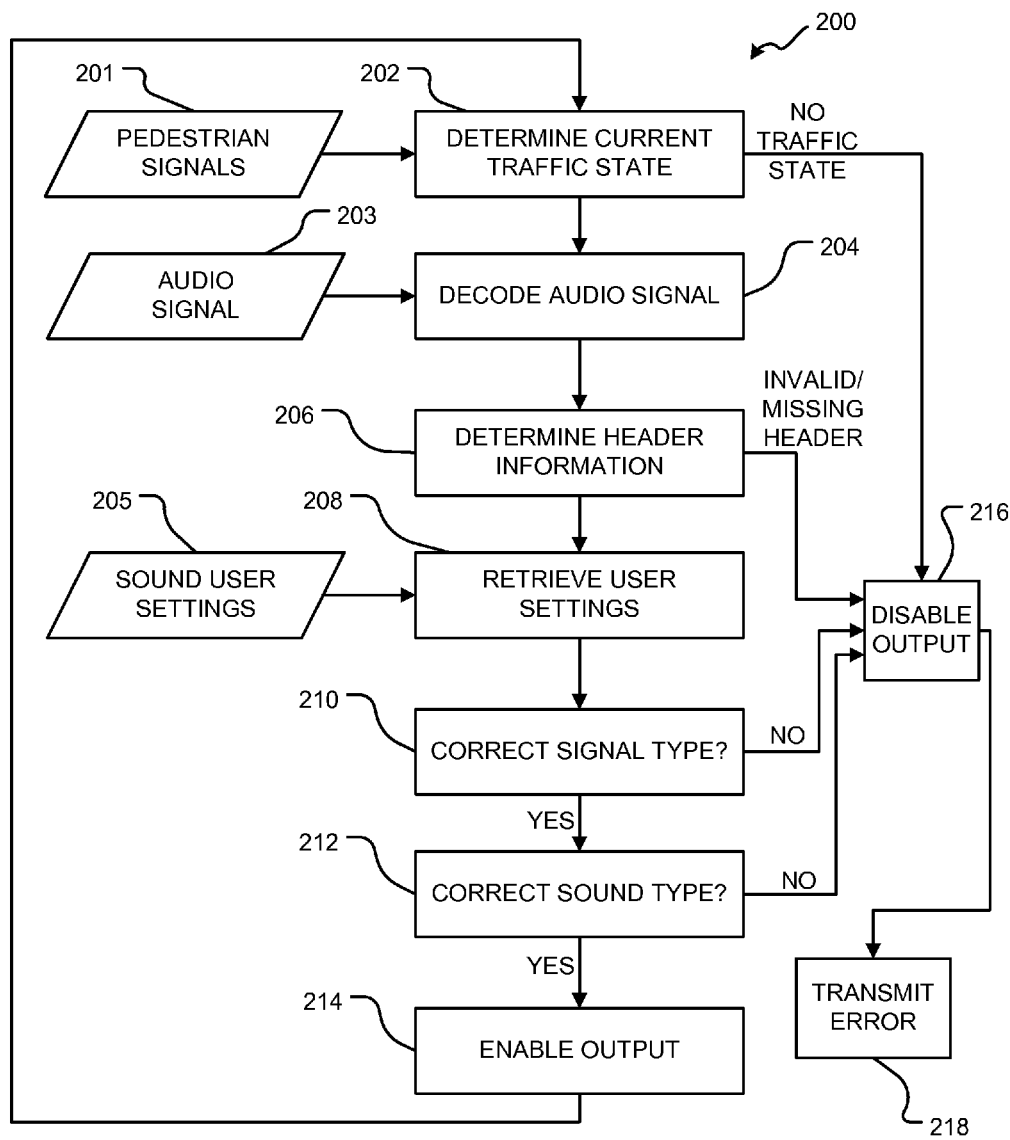
FIG. 6 is a flowchart illustrating a method of conflict monitoring and error detection according to one embodiment that may be performed by the primary conflict monitor and error detector of FIG. 2.
Figure 7:
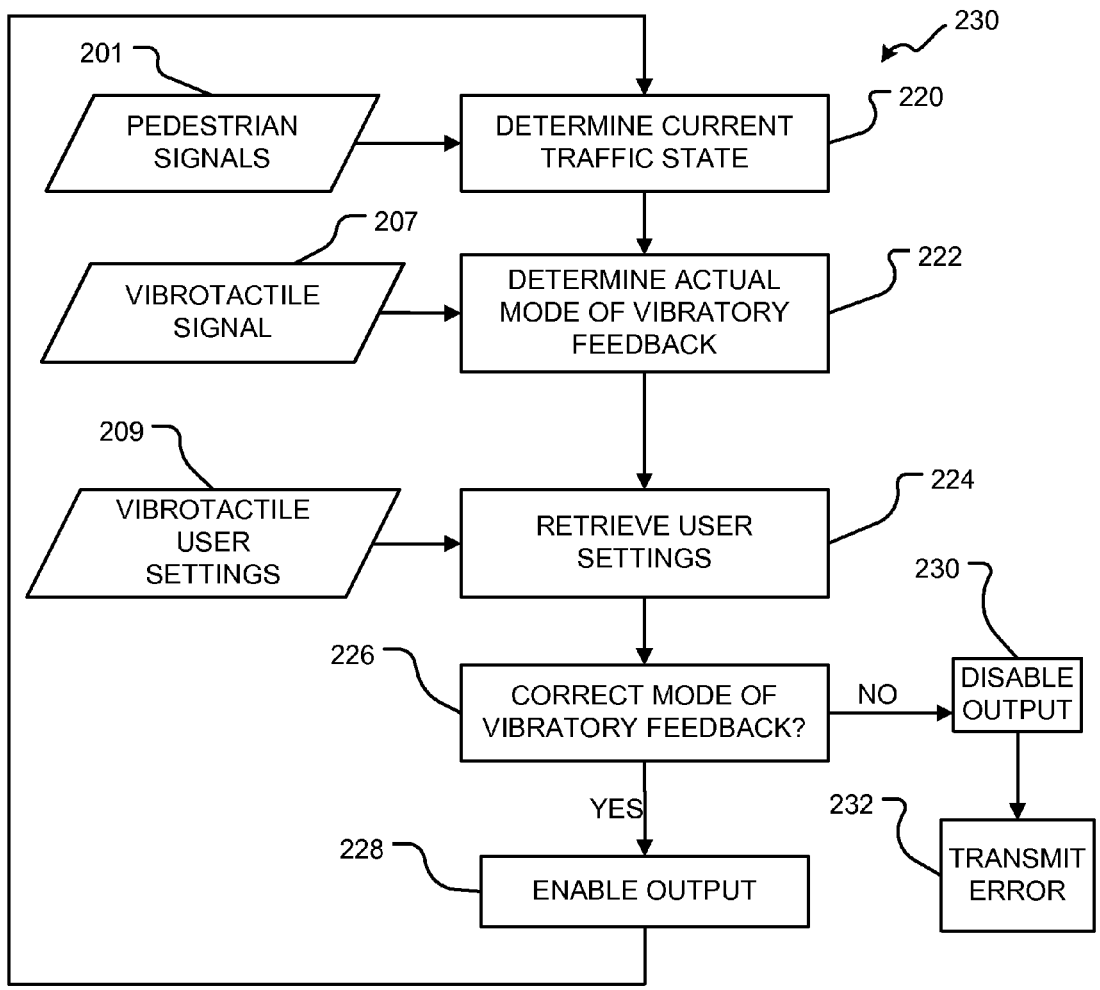
FIG. 7 is a flowchart illustrating another method of conflict monitoring and error detection according to one embodiment that may be performed by the primary conflict monitor and error detector of FIG. 2.

FIGS. 6 and 7 illustrate methods 200 and 230, respectively, of conflict monitoring and error detection that may be performed by primary conflict monitor and error detector 102. Method 200 verifies that pedestrian signals and audio control signals satisfy certain conditions prior to enabling output of the audio control signals to speakers 84, 86. Method 230 verifies that vibrotactile control signals satisfy certain conditions prior to enabling output of the vibrotactile control signals to vibration actuator 109.

Method 200 of FIG. 6 begins at block 202 by receiving pedestrian signals 201 and determining a current traffic state on the basis of pedestrian signals 201. If a valid traffic state cannot be determined at block 202 from pedestrian signals 201, method 200 proceeds to block 216. At block 216 output of audio control signals to speakers 84, 86 is disabled (and also output of vibrotactile control signals to vibration actuator 109 may be disabled), and an error message is optionally transmitted at block 218 to an APS malfunction management subsystem 104. However, if a valid traffic state can be determined at block 202, method 200 proceeds to block 204 at which an audio control signal 203 is received and decoded.

At block 206, it is determined whether the decoding of audio control signal 203 provides valid sound header information (e.g. identifying parameters of the audible pedestrian signal indication to be output at speakers 84, 86, such as an actual signal type and an actual sound type). If invalid sound header information is provided at block 206, output of audio control signals is disabled at block 216, and an error message is optionally transmitted at block 218 to APS malfunction management subsystem 104. Otherwise, method 200 proceeds to block 208 by retrieving sound user settings 205 from memory. Sound user settings 205 may identify an expected signal type and sound type associated with the current traffic state determined at block 202.

At block 210, the expected signal type (as identified by sound user settings 205 at block 208) is compared with the actual signal type (as provided by the sound header information at block 206). If the expected and actual signal types differ, output of audio control signals is disabled at block 216, and an error message is optionally transmitted at block 218 to APS malfunction management subsystem 104. Otherwise, method 200 proceeds to block 212.

At block 212, the expected sound type (as identified by sound user settings 205 at block 208) is compared with the actual sound type (as provided by the sound header information at block 206). If the expected and actual sound types differ, output of audio control signals is disabled at block 216, and an error message is optionally transmitted at block 218 to APS malfunction management subsystem 104. Otherwise, method 200 proceeds by enabling output of audio control signal 203 to speakers 84, 86 at block 214. Output may be enabled for a period of time defined by the sound header information provided at block 206. Method 200 may repeat (commencing at block 202) for the next audio control signal 203 detected and received by primary conflict monitor and error detector 102.

In addition to performing method 200, primary conflict monitor and error detector 102 may perform method 230 of FIG. 7. Method 230 begins at block 220 by receiving pedestrian signals 201 and determining a current traffic state on the basis of pedestrian signals 201 (this step may use the current traffic state already determined at block 202 of method 200). At block 222, a vibrotactile control signal 207 is received and evaluated to determine an actual mode of vibratory feedback for the vibrotactile pedestrian signal indications to be provided by output of vibrotactile control signal 207 to vibration actuator 109. At block 224, vibrotactile user settings 209 are retrieved from memory. Vibrotactile user settings 209 may identify an expected mode of vibratory feedback associated with the current traffic state determined at block 220.

At block 226, the expected mode of vibratory feedback (as identified by vibrotactile user settings 209 at block 224) is compared with the actual mode of vibratory feedback (as determined from the vibrotactile control signal 207 at block 222). If the expected and actual modes of vibratory feedback differ, output of vibrotactile control signals is disabled at block 230, and an error message is optionally transmitted at block 232 to an APS malfunction management subsystem 104. Otherwise, method 230 proceeds by enabling output of vibrotactile control signal 207 to vibration actuator 109 at block 228. Method 230 may repeat (commencing at block 220) for the next vibrotactile control signal 207 detected and received by primary conflict monitor and error detector 102. In particular embodiments, method 230 may repeat (commencing at block 220) for the next vibrotactile control signal 207 which is detected and received by primary conflict monitor and error detector 102 after the current traffic state has changed (as it may suffice to verify only the first vibrotactile control signal 207 received during a particular traffic interval, and not every vibrotactile control signal 207 generated for the traffic interval).

System 100 may provide secondary conflict monitoring and error detection. As seen in FIG. 1, a secondary conflict monitor and error detector 103 may be implemented by an APS malfunction management subsystem 104. Subsystem 104 may be housed within a cabinet which houses traffic signal controller 90. Subsystem 104 may handle secondary conflict monitoring and error detection for all button stations 80 that are in communication with traffic signal controller 90 (i.e. which is generally all button stations 80 located at a traffic intersection). Subsystem 104 may communicate with traffic signal controller 90 via a communications interface unit 120. Communications interface unit 120 processes and decodes information received by traffic signal controller 90 over powerline communications line 95. Communications interface unit 120 may communicate with traffic signal controller 90 by way of discrete digital inputs/outputs, Ethernet, USB (universal serial bus) connection, SDLC (synchronous data link communications) interface, and the like. Communications interface unit 120 is not necessary for all communications. In some embodiments, subsystem 104 receives at least some inputs directly from traffic signal controller 90 (e.g. pedestrian signals carried over lines 92A, 92B).

Subsystem 104 receives input from a plurality of sources, and monitors the information received for conflict or error. If a conflict or error is detected at an APS button station 80, subsystem 104 responds accordingly. For example, for particular conflicts or errors, subsystem 104 inhibits output of audible and/or vibrotactile pedestrian signal indications at the APS button station 80 at which the conflict or error is detected. In certain embodiments, for some conflicts or errors, subsystem 104 may transmit inhibit commands via powerline communications line 95 to inhibit output of audible and/or vibrotactile pedestrian signal indications at the APS button station 80 at which the conflict or error is detected. For particular conflicts or errors, subsystem 104 may transmit inhibit commands via powerline communications line 95 to each APS button station 80 connected to a traffic signal controller 90, to inhibit output of audible and/or vibrotactile pedestrian signal indications at the button stations.

In particular embodiments, subsystem 104 receives and monitors the following inputs:

Pedestrian signals carried over lines 92A, 92B, received via communications interface unit 120 (see FIGS. 1 and 5) (or directly from traffic signal controller 90 signal outputs). Subsystem 104 may monitor current traffic state (e.g. WALK, FLASHING DON'T WALK, or SOLID DON'T WALK) based on such pedestrian signals.

Figure 5:
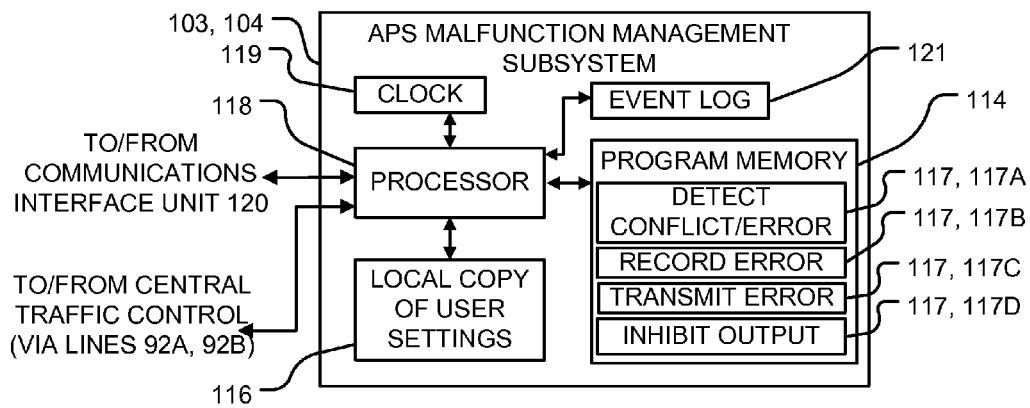
FIG. 5 schematically depicts a specific implementation of a secondary conflict monitor and error detector according to one embodiment that may be used in the conflict monitoring and error detection system of FIG. 1.

Information from button station 80 carried over powerline communications line 95, received via communications interface unit 120 (see FIGS. 1 and 5). For example, primary conflict monitor and error detector 102 of button station 80 may transmit the following information about control signals 105 over powerline communications line 95: button station 80's identification number (unique to each button station); and sound header information, such as for example, sound reference number, or sound code (sound type) and signal type. To avoid or reduce congestion on the powerline communications network, primary conflict monitor and error detector 102 may be configured to transmit only the header information for each new sound file (i.e. to transmit only "new" sounds on the network). In certain embodiments, primary conflict monitor and error detector 102 may also periodically transmit information about vibrotactile control signals 112 over powerline communications line 95. For example, an identification of the actual mode of vibratory feedback to be provided by output of vibrotactile control signal 112 may be transmitted each time the pedestrian signal status changes.

As seen in FIG. 5, subsystem 104 may store a local copy of user settings 91 for each button station 80 in memory 116. This local copy may be updated each time the user settings 91 at a button station 80 are reconfigured or changed by service personnel.

In certain embodiments, output of audible and/or vibrotactile pedestrian signal indications may be inhibited if subsystem 104 detects one or more of the following conflicts or errors:

The signal type received over the powerline communications line 95 does not match the current traffic state.

The sound type received over powerline communications line 95 does not match the sound type specified in user settings 91 for the current traffic state.

The mode of vibratory feedback received over powerline communications line 95 does not match the mode of vibratory feedback specified in user settings 91 for the current traffic state.

If one of the foregoing conflicts or errors is detected, subsystem 104 may inhibit audible and vibrotactile output at the button station 80 where the conflict or error is detected. In some embodiments, depending on the severity and/or number of occurrences of the conflict or error detected, one or both of audible and vibrotactile output at button station 80 may be inhibited, or audible and/or vibrotactile output at button stations 80 connected to a traffic signal controller 90 may be inhibited. The steps to be taken may allow for graceful degradation so that functional components may continue operating—for example, in particular embodiments, if the error or conflict occurs only once, then only the affected audible or vibrotactile output at the button station is inhibited; however, if the error or conflict is a repeat occurrence, then all audible or vibrotactile output is inhibited at the button station. The audible and/or vibrotactile outputs may remain inhibited until button station 80's operation is reset by service personnel.

In some embodiments, if a conflict or error is detected, subsystem 104 communicates an alarm or error message to a central traffic control communications unit (not shown) via an Ethernet, hardware (e.g. digital output), or other connection. In some embodiments, subsystem 104 may cause other error-free button stations 80 within the traffic intersection to play a "maintenance call" sound until button stations 80 are reset by service personnel.

Subsystem 104 may be configured to maintain an event log. The event log may include normal events and errors. An error report may be generated and stored in an event log repository 121 each time subsystem 104 receives an error message from a primary conflict monitor and error detector 102 (as transmitted at block 218 of method 200 of FIG. 6 or block 232 of method 230 of FIG. 7, for example) or each time subsystem 104 has detected a conflict or error as described above. An error report may include: time and date of error; phase information for the button and intersection at the time the error occurred (e.g. WALK or DON'T WALK, or north-south or east-west crossing); sound type expected; sound type detected; button station identification number; and button station location.

Subsystem 104 may include a real-time clock 119 (see FIG. 5) which may be used to provide a synchronization signal to the button stations 80 to synchronize output of audible pedestrian signal indications. Clock 119 may be used by button stations 80 to adjust the volume settings for the audible pedestrian signal indications and/or inhibit audible pedestrian signal indications at one or more speakers according to the time of day. Clock 119 may be used by button stations 80 to determine when to play special alert messages (e.g. alerts regarding construction or traffic patterns, AMBER alert or emergency alert messages, etc.) according to the time of day. Clock 119 may also provide time-stamps for event logging purposes.

Subsystem 104 may be implemented as software, hardware and/or a combination thereof. As illustrated in FIG. 5, subsystem 104 may comprise a processor 118 which executes instructions provided by software stored in a program memory 114 accessible by processor 118. Processor 118 may comprise a central processing unit (CPUs), one or more microprocessors, one or more field programmable gate arrays (FPGAs), or any combination thereof, or any other suitable processing unit(s) comprising hardware and/or software capable of functioning as described herein.

Software stored in program memory 114 may include functions 117 to perform the conflict monitoring and error detection steps described above, such as:

Function 117A for detecting a conflict or error with respect to a button station 80's audio or vibrotactile control signals.

Function 117B for generating and recording an error report with respect to a conflict or error detected by function 117A.

Function 117C for transmitting an alarm or error message to a central traffic control communications unit regarding a conflict or error detected by function 117A.

Function 117D for inhibiting output of audible and/or vibrotactile pedestrian signal indications at the button station 80 where a conflict or error is detected by function 117A.

Figure 8:
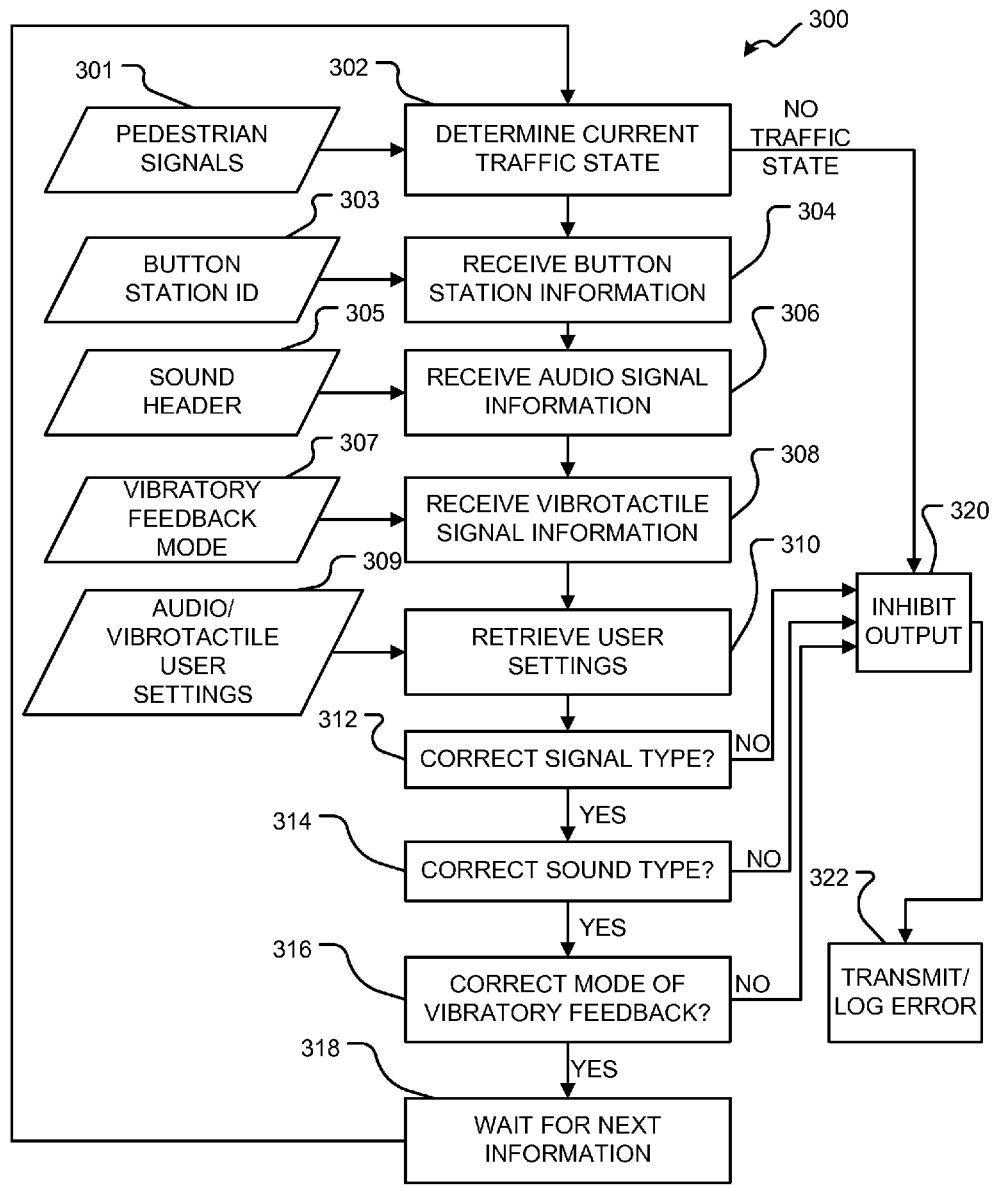
FIG. 8 is a flowchart illustrating a method of conflict monitoring and error detection according to one embodiment that may be performed by the secondary conflict monitor and error detector of FIG. 5.

FIG. 8 illustrates a method 300 of conflict monitoring and error detection that may be performed by secondary conflict monitor and error detector 103, as implemented by APS malfunction management subsystem 104 of system 100. Method 300 may provide redundant conflict monitoring and error detection for system 100 for a button station 80, in conjunction with primary conflict monitor and error detector 102 implementing methods 200 and 230 (FIGS. 6 and 7).

Method 300 begins at block 302 by determining a current traffic state on the basis of pedestrian signals 301 (either received as direct inputs from lines 92A, 92B or through a communications interface unit). If no valid traffic state is determinable from pedestrian signals 301, method 300 proceeds to block 320 by inhibiting output of all audible and vibrotactile pedestrian signal indications at button stations 80 that are affected, and generating an error report at block 322 (and optionally transmitting the error report to a central traffic control communications unit).

If a valid current traffic state is determinable at block 302, method 300 proceeds by receiving button station information at block 304. Button station information may comprise a button station identification number 303 identifying the button station 80 which is transmitting the information to APS malfunction management subsystem 104. At block 306, audio signal information (such as sound header information 305) is received for an audio control signal generated for output to button station 80's speakers 84, 86. At block 308, vibrotactile signal information (such as a mode of vibratory feedback 307) may be received for a vibrotactile control signal generated for output to button station 80's vibration actuator 109. Button station information, audio signal information, and vibrotactile signal information may be conveyed over powerline communications line 95 to communications interface unit 120, which relays such information to APS malfunction management subsystem 104.

At block 310, method 300 proceeds by retrieving user settings 309 (including audio and vibrotactile user settings) associated with the current traffic state determined at block 302. User settings 309 may be retrieved from memory accessible to APS malfunction management subsystem 104 (such as memory 116 shown in FIG. 5). Method 300 then evaluates the actual parameters of the audible and vibrotactile pedestrian signal indications (as may be determined from the block 306 audio signal information and the block 308 vibrotactile signal information) against the expected parameters of the audible and vibrotactile pedestrian signal indications as identified by user settings 309 associated with the current traffic state. For example, at block 312, method 300 compares the actual and expected signal types for the audible pedestrian signal indications. At block 314, method 300 compares the actual and expected sound types for the audible pedestrian signal indications. At block 316, method 300 compares the actual and expected modes of vibratory feedback for the vibrotactile pedestrian signal indications. If the actual and expected parameters match, method 300 proceeds to block 318, at which APS malfunction management subsystem 304 may wait for the next audio or vibrotactile signal information to be received (e.g. by way of communications interface unit 120).

If there is a difference between the actual and expected parameters at any of blocks 312, 314, or 316, method 300 proceeds to block 320. At block 320, output of all of the affected audible and vibrotactile pedestrian signal indications may be inhibited, regardless of the conflict or error which led to block 320. In other embodiments, output of one or both of the audible and vibrotactile pedestrian signal indications may be inhibited, depending on the conflict or error which led to block 320 (e.g. an invalid traffic state at block 302 may result in inhibition of all affected audible and vibrotactile pedestrian signal indications, whereas an error in audible pedestrian signal indications at blocks 312 or 314 may result in inhibition of affected audible pedestrian signal indications only). An error report is generated at block 322 (and optionally transmitted to a central traffic control communications unit).

Method 300 may repeat (commencing at block 302) each time new information is received through communications interface unit 120.

In other embodiments, method 300 may be implemented as part of a conflict monitoring and error detection system 100 which does not include a primary conflict monitor and error detector 102 performing the methods of 200 and 230 at button station 80. For example, APS generator 98 (or another suitable component at button station 80) may be adapted to provide information about audio and vibrotactile control signals over powerline communications line 95 for verification by APS malfunction management subsystem 104 using method 300.

Where a component (e.g. module, processor, controller, server, circuit, interface, device, amplifier, etc.) is referred to above, unless otherwise indicated, reference to that component (including a reference to a "means") should be interpreted as including as equivalents of that component any component which perform the function of the described component (i.e., that is functionally equivalent), including components which are not structurally equivalent to the disclosed structure which perform the function in the illustrated exemplary embodiments of the invention.

Conflict monitoring and error detection system 100 and components thereof may be configured to perform a method according to the embodiments described herein. For example, primary conflict monitor and error detector 102 (FIG. 4) may implement methods 200 and 230 (FIGS. 6 and 7) by executing software instructions provided by functions 115. Secondary conflict monitor and error detector 103 (FIG. 5) may implement method 300 (FIG. 8) by executing software instructions provided by functions 117. Particular embodiments may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

While a number of exemplary aspects and embodiments have been discussed above, those of skill in the art will recognize certain modifications, permutations, additions and sub-combinations thereof. For example:

In some embodiments, conflict monitoring and error detection system 100 may comprise only a primary conflict monitor and error detector 102 (provided within each button station 80), without a secondary conflict monitor and error detector 103.

In other embodiments, conflict monitoring and error detection system 100 may comprise a conflict monitor and error detector 103 implemented by an APS malfunction management subsystem 104, without a primary conflict monitor and error detector 102 as described herein. A processor may be provided at each button station 80 to receive control signals generated by APS generator 98 for driving speakers 84, 86 and vibration actuator 109. Such processor may decode or process the control signals (e.g. so as to extract the sound header information for an audible control signal and to determine the mode of vibratory feedback for a vibrotactile control signal) and transmit the decoded information to APS malfunction management subsystem 104 for verification against the current traffic state and user settings.

The APS systems described herein include a button speaker 84 and an overhead speaker 86. In other embodiments, different combinations of speakers may be provided. Conflict monitoring and error detection system 100 may be adapted to control output for different combinations of speakers.

Processors 99, 110 may be substituted with a single processor or control and processing unit capable of providing the signal generation, conflict and error detection, and output control functions described herein.

Communications interface unit 120 may receive signals from traffic signal controller 90 indicating special events, such as, for example: train approaching, emergency vehicle approaching, new construction or traffic patterns, AMBER alert or emergency alerts, etc. Upon receiving such signals, communications interface unit

120 may send a request to button station 80 to generate audible alert messages. The alert messages may be preloaded in button station 80 or may be downloaded (from communications interface unit 120, for example) to button station 80 over powerline communications line 95.

Prior to deployment and from time to time, secondary conflict monitor and error detector 103 may be run through a series of tests to verify that the unit is operating normally. To run such tests, verification software may be provided on a computer or hardware device which is connected to secondary conflict monitor and error detector 103; the software may send test signals to secondary conflict monitor and error detector 103 and record and verify the response.

In some embodiments, one or more of the relays used to control audible or vibrotactile output (e.g. relays 106, 106A, 106B and/or 107) may be placed in a closed (operative) position as the default position. When one or more errors or conflicts are detected, the relay may be switched to an open (inoperative) position until the error or conflict is resolved.

It is therefore intended that the following appended claims and claims hereafter introduced are interpreted to include all such modifications, permutations, additions and sub-combinations as are within their true spirit and scope.

What is claimed is:

1. A method of conflict monitoring and error detection for an APS system, the method comprising:
 monitoring pedestrian signals from a traffic signal controller to determine a current traffic state;
 receiving and decoding an audio control signal generated for output to a speaker, the audio control signal encoded with a digital code identifying a plurality of actual parameters for an audible pedestrian signal indication;
 retrieving from a memory a first plurality of expected parameters for the audible pedestrian signal indication associated with the current traffic state;
 providing an APS malfunction management subsystem;
 transmitting information about the current traffic state and the plurality of actual parameters for the audible pedestrian signal indication over a powerline communications line to the APS malfunction management subsystem;
 retrieving from a local memory of the APS malfunction management subsystem a second plurality of expected parameters for the audible pedestrian signal indication associated with the current traffic state;
 comparing the plurality of actual parameters with the first plurality of expected parameters and comparing the plurality of actual parameters with the second plurality of expected parameters; and
 inhibiting output of the audio control signal to the speaker if one or more of the following errors are detected:
  a valid traffic state is indeterminable from the pedestrian signals;
  the plurality of actual parameters differs from the first plurality of expected parameters; and
  the plurality of actual parameters differs from the second plurality of expected parameters.

2. A method according to claim 1, wherein the plurality of actual parameters, the first plurality of expected parameters, and the second plurality of expected parameters comprise a sound type.

3. A method according to claim 2, wherein the plurality of actual parameters, the first plurality of expected parameters, and the second plurality of expected parameters comprise a signal type.

4. A method according to claim 3, comprising:
 providing a first switch connected between the speaker and a source of the audio control signal; and
 maintaining the first switch in an open position if output of the audio control signal to the speaker is inhibited.

5. A method according to claim 4, comprising decoding the audio control signal to identify a message duration from the first plurality of actual parameters, wherein if no error is detected, output of the audio control signal to the speaker is enabled by placing the first switch in a closed position for the message duration.

6. A method according to claim 4, comprising:
 receiving a vibrotactile control signal generated for output to a vibration actuator to provide a vibrotactile pedestrian signal indication;
 evaluating the vibrotactile control signal to determine an actual mode of vibratory feedback for the vibrotactile pedestrian signal indication;
 retrieving from memory an expected mode of vibratory feedback associated with the current traffic state;
 comparing the actual mode of vibratory feedback with the expected mode of vibratory feedback; and
 inhibiting output of the vibrotactile control signal to the vibration actuator if the actual mode of vibratory feedback differs from the expected mode of vibratory feedback.

7. A method according to claim 6, comprising:
 providing a second switch connected between the vibration actuator and a source of the vibrotactile control signal; and
 maintaining the second switch in an open position if output of the vibrotactile control signal to the vibration actuator is inhibited.

8. A method according to claim 1, comprising transmitting an error message to a central traffic control communications unit if the output of the audio control signal to the speaker is inhibited.

9. A method according to claim 6, comprising:
 transmitting information about the actual mode of vibratory feedback for the vibrotactile pedestrian signal indication over the powerline communications line to the APS malfunction management subsystem;
 retrieving from the local memory of the APS malfunction management subsystem a second expected mode of vibratory feedback for the vibrotactile pedestrian signal indication associated with the current traffic state;
 comparing the actual mode of vibratory feedback with the second expected mode of vibratory feedback; and
 inhibiting output of the vibrotactile control signal to the vibration actuator if the actual mode of vibratory feedback differs from the second expected mode of vibratory feedback.

10. An accessible pedestrian signal (APS) system comprising:
 a pushbutton for providing pedestrian input to a traffic signal controller;
 an APS generator connected to receive pedestrian signals from the traffic signal controller and configured to generate an audio control signal for output to a speaker based at least in part on the pedestrian signals;
 a primary conflict monitor and error detector configured to control output of the audio control signal to the speaker and to monitor the pedestrian signals, the primary conflict monitor and error detector receiving and evaluating the audio control signal and inhibiting output of the audio control signal to the speaker if one or more errors are detected with respect to the audio control signal or the pedestrian signals, wherein the primary conflict monitor and error detector is configured to transmit information relating to the audio control signal and the pedestrian signals over a powerline communications line; and a secondary conflict monitor and error detector connected to receive and evaluate the information transmitted over the powerline communications line and configured to inhibit output of the audio control signal to the speaker if one or more errors are detected with respect to the audio control signal or the pedestrian signals.

11. An APS system according to claim 10, wherein the primary conflict monitor and error detector monitors the pedestrian signals to determine a current traffic state, and detects an error with respect to the pedestrian signals if an invalid traffic state is determined.

12. An APS system according to claim 11, comprising a first repository for storing a plurality of local user settings, the local user settings defining an expected sound type associated with the current traffic state, wherein the APS generator is configured to output the audio control signal encoded with a predefined digital code identifying an actual sound type for the audio control signal, and wherein the primary conflict monitor and error detector decodes the audio control signal to ascertain the actual sound type and detects an error with respect to the audio control signal if the actual sound type does not match the expected sound type associated with a current local user setting.

13. An APS system according to claim 12, wherein the digital code encoded in the audio control signal further identifies an actual signal type for the audio control signal, and wherein the primary conflict monitor and error detector decodes the audio control signal to ascertain the actual signal type and detects an error with respect to the audio control signal if the actual signal type does not match the current traffic state.

14. An APS system according to claim 13, comprising a first switch connected between the APS generator and the speaker, wherein the first switch is moved by the primary conflict monitor and error detector to a closed position to enable output of the audio control signal to the speaker if no error is detected with respect to the audio control signal or the pedestrian signals, and otherwise is maintained in an open position to inhibit output of the audio control signal to the speaker.

15. An APS system according to claim 14, wherein if the first switch is moved to the closed position, the primary conflict monitor and error detector decodes the audio control signal to identify a length of time for the audio control signal, and maintains the first switch in the closed position for the identified length of time.

16. An APS system according to claim 14, comprising a vibration actuator connected to drive the pushbutton to provide vibrotactile feedback, wherein the APS generator is configured to generate a vibrotactile control signal for output to the vibration actuator based at least in part on the pedestrian signals, and wherein the primary conflict monitor and error detector is configured to control output of the vibrotactile control signal to the vibration actuator, the primary conflict monitor and error detector receiving and evaluating the vibrotactile control signal, and inhibiting output of the vibrotactile control signal to the vibration actuator if one or more errors are detected with respect to the vibrotactile control signal.

17. An APS system according to claim 16, wherein the local user settings define an expected mode of vibratory feedback associated with the current traffic state, and the primary conflict monitor and error detector evaluates the vibrotactile control signal to identify an actual mode of vibratory feedback, and detects an error with respect to the vibrotactile control signal if the actual mode of vibratory feedback differs from the expected mode of vibratory feedback associated with the current traffic state.

18. An APS system according to claim 16, comprising a second switch connected between the APS generator and the vibration actuator, wherein the second switch is moved by the primary conflict monitor and error detector to a closed position to enable output of the vibrotactile control signal to the vibration actuator if no error is detected with respect to the vibrotactile control signal, and otherwise is maintained in an open position to inhibit output of the vibrotactile control signal to the vibration actuator.

19. An APS system according to claim 18, wherein the secondary conflict monitor and error detector comprises a second repository containing button station user settings defining a button station signal type and a button station sound type associated with the current traffic state, the secondary conflict monitor and error detector configured to:

retrieve the button station user settings from the second repository; and detect an error with respect to the audio control signal if one or more of the button station signal type or the button station sound type associated with the current traffic state does not match the corresponding information received over the powerline communications line.

20. An APS system according to claim 19, wherein the primary conflict monitor and error detector is configured to transmit information relating to the vibrotactile control signal over the powerline communications line, the secondary conflict monitor and error detector configured to inhibit output of the vibrotactile control signal to the vibration actuator if one or more errors are detected with respect to the vibrotactile control signal.

* * * * *